United States Patent [19]
Laune

[11] 3,714,463
[45] Jan. 30, 1973

[54] DIGITAL FREQUENCY AND/OR PHASE DETECTOR CHARGE PUMP

[75] Inventor: Jon M. Laune, Tempe, Ariz.

[73] Assignee: Motorola, Inc., Franklin Park, Ill.

[22] Filed: Jan. 4, 1971

[21] Appl. No.: 103,389

[52] U.S. Cl. ....................307/232, 307/233, 328/134
[51] Int. Cl. ...........................H03b 3/04, H03d 13/00
[58] Field of Search ......328/133, 134, 141; 307/232, 307/233; 324/168

[56] References Cited

UNITED STATES PATENTS

| | | | |
|---|---|---|---|
| 3,354,455 | 11/1967 | Briggs et al. | 324/186 X |
| 3,430,148 | 2/1969 | Miki | 328/133 |
| 3,610,954 | 10/1971 | Treadway | 307/233 |
| 3,626,307 | 12/1971 | Koyama | 307/233 X |
| 3,005,165 | 10/1961 | Lenigan | 328/133 X |
| 3,056,083 | 9/1962 | Peterson | 328/133 X |
| 3,478,178 | 11/1969 | Grace | 328/134 X |
| 3,521,174 | 7/1970 | Naubereit et al. | 328/134 X |

*Primary Examiner*—John S. Heyman
*Attorney*—Mueller, Aichele & Gillman

[57] ABSTRACT

A digital frequency and/or phase detector is disclosed wherein a time varying reference signal is received in one bistable device only, a time varying feedback signal is received in another bistable device only, and corresponding portions of each cycle of said signals are compared in digital logic circuitry supplied by the outputs of the two bistable devices. A logic signal developed by the first occurrence of the corresponding portion of one of the time varying signals effects, through the logic circuitry, turn on of a responsive circuit, a logic signal developed by the subsequent occurrence of the corresponding portion of the other of said time varying signals effects, through the logic circuitry, turn off of such responsive circuit, and an analog signal is developed by such responsive circuit in relation to the time interval between the occurence of the corresponding portions of the time varying signals.

11 Claims, 12 Drawing Figures

INVENTOR.
Jon M. DeLaune
BY
Mueller & Aichele
ATTY'S

INVENTOR.
Jon M. DeLaune
BY Mueller & Aichele
ATTY'S

INVENTOR.
Jon M. DeLaune

BY Mueller & Aichele
ATTY'S

Fig. 6A

CLOCKED $\bar{J}$-$\bar{K}$ TRUTH TABLE
FOR
FLIP FLOP A

| $\bar{J}$ | $\bar{K}$ | $\bar{C}_A$ | $Q_A$ |
|---|---|---|---|
| 1 | 0 | 1 | 0 |

(ON TRANSITION FROM "0" TO "1" LOGIC LEVEL)

Fig. 6B

CLOCKED $\bar{J}$-$\bar{K}$ TRUTH TABLE
FOR
FLIP FLOP B

| $\bar{J}$ | $\bar{K}$ | $\bar{C}_B$ | $Q_B$ |
|---|---|---|---|
| 0 | 1 | 1 | 1 |

(ON TRANSITION FROM "0" TO "1" LOGIC LEVEL)

Fig. 7

R-S TRUTH TABLE

| | R | S | $Q^{n+1}$ |
|---|---|---|---|
| 1. | 0 | 0 | $Q^n$ |
| 2. | 0 | 1 | 1 |
| 3. | 1 | 0 | 0 |

Fig. 8A

TRUTH TABLE-GATE 1

| | $Q_A$ | $\bar{Q}_B$ | Z |
|---|---|---|---|
| 1. | 0 | 0 | 1 |
| 2. | 1 | 0 | 0 |
| 3. | 0 | 1 | 0 |
| 4. | 1 | 1 | 0 |

Fig. 8B

TRUTH TABLE-GATE 2

| | Z | $\bar{Q}_A$ | X | $Q_1$ |
|---|---|---|---|---|
| 1. | 0 | 0 | 1 | OFF |
| 2. | 1 | 0 | 0 | ON |
| 3. | 0 | 1 | 0 | ON |
| 4. | 1 | 1 | 0 | ON |

Fig. 8C

TRUTH TABLE-GATE 3

| | Z | $\bar{Q}_B$ | Y | $Q_2$ |
|---|---|---|---|---|
| 1. | 0 | 0 | 1 | ON |
| 2. | 1 | 0 | 0 | OFF |
| 3. | 0 | 1 | 0 | OFF |
| 4. | 1 | 1 | 0 | OFF |

INVENTOR
Jon M. DeLaune
BY Mueller & Aichele
ATTY'S

DIGITAL FREQUENCY AND/OR PHASE DETECTOR CHARGE PUMP

BACKGROUND OF THE INVENTION

The invention relates to digital frequency and/or phase detectors or comparators and is an object of the invention to provide improved apparatus or systems of this character.

Digital frequency and/or phase detectors and systems are known to the art but they have limited application because of their complexity, higher cost, and limitations in comparison range of phase or frequency, particularly being limited in phase comparison to less than 360°. Accordingly it is a further object of the invention to provide improved apparatus and systems of the nature indicated which obviate the deficiencies of the prior art.

It is a further object of the invention to provide an improved digital phase-locked loop circuit.

It is a further object of the invention to provide apparatus and systems of the nature indicated which are both frequency and phase sensitive.

It is a further object of the invention to provide improved apparatus and systems of the nature indicated wherein phase lock or comparison of either frequency or phase is possible over a phase difference of either plus or minus 360°.

It is a further object of the invention to provide improved apparatus and systems of the nature indicated which are inexpensive to manufacture and accurate in operation.

It is a further object of the invention to provide improved apparatus and systems of the nature indicated which are useful in connection with digital frequency synthesis, data acquisition, signal demodulation and other frequency-phase detection schemes.

It is a further object of the invention to provide improved apparatus and systems of the nature indicated which are adaptable for integrated circuits as well as discrete embodiments.

SUMMARY OF THE INVENTION

In carrying out the invention according to one form, there is provided a digital control circuit for comparing relative time positions of corresponding portions of first and second time varying signals comprising a first bistable means adapted to receive only said first time varying signal, and being adapted in one of its bistable states to provide, in response to the occurrence of said corresponding portion of said first time varying signal, an output signal; a second bistable means adapted to receive only said second time varying signal, and being adapted in one of its bistable states to provide, in response to the occurrence of said corresponding portion of said second time varying signal, a second output signal; logic means for comparing said first and second output signals and providing a change of state output signal upon the occurrence of the second one of said corresponding portions of said first and second time varying signals; and means for applying said change of state signal to said first and second bistable means.

In carrying out the invention according to another form, there is provided a digital control circuit for detecting the phase between a time varying reference signal and a time varying signal responsive to such phase which is fed back from the output of such circuit comprising a first bistable means adapted to receive only said reference signal, and being adapted in one of its bistable states to provide, in response to the occurrence of a specified condition of said reference signal, an output signal; a second bistable means adapted to receive only said time varying fed back signal, and being adapted in one of its bistable states to provide, in response to the occurrence of the same specified condition of said time varying fed back signal, a second output signal; logic means for comparing said first and second output signals and providing a change of state output signal upon the occurrence of the second one of said specified conditions of said time varying reference and fed back signals; means for applying said change of state signal to said first and second bistable means; and means for generating an output signal in accordance with the phase difference between said specified conditions of said reference and fed back time varying signals.

DESCRIPTION OF THE DRAWINGS

FIG. 6A is the truth table for one component of the circuit of FIG. 1;

FIG. 6B is the truth table for another component of the circuit of FIG. 1;

FIG. 7 is a further truth table also applicable to the same components as truth tables 6A and 6B;

FIGS. 8A, 8B and 8C are truth tables for other components of the circuit of FIG. 1.

DESCRIPTION OF THE PREFERRED EMBODIMENTS

Figure 1:
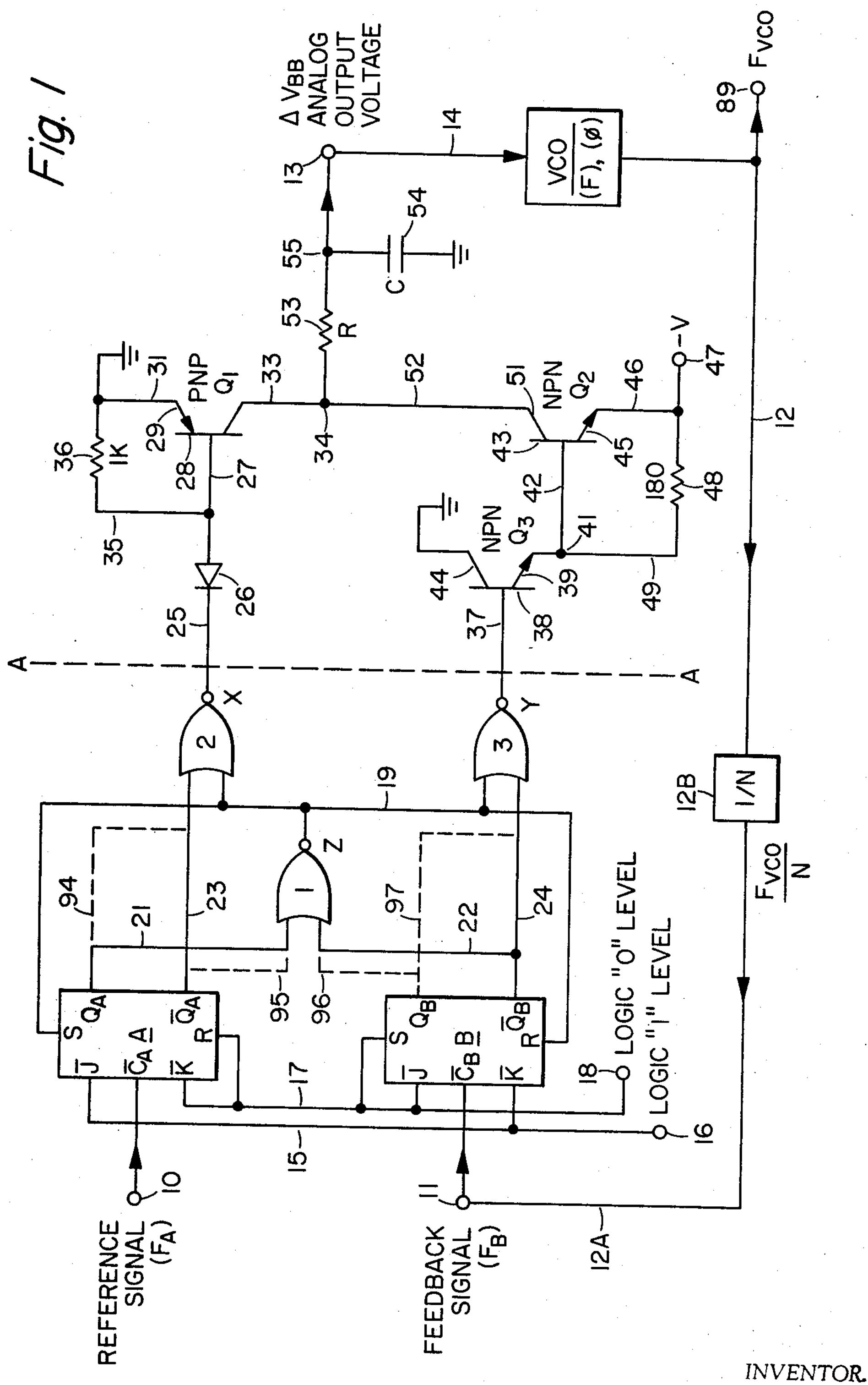
FIG. 1 is a circuit diagram of one embodiment of the invention.

Referring to FIG. 1 the invention is shown embodied in a circuit comprising a bistable device or flip-flop A, a bistable device or flip-flop B, NOR gates 1, 2 and 3, transistors Q1, Q2 and Q3, a charging circuit comprising resistor R and capacitor C, and a voltage controlled oscillator VCO.

Flip-flops A and B may be of any well known type operating according to the applicable truth tables shown in the drawings and may be of the type made and sold by Motorola, Inc., the assignee of the subject application under the general designation of $\bar{J}$–$\bar{K}$ flip-flops. Similarly the gates 1, 2 and 3 which are shown as NOR gates may be of any conventional form operating according to the applicable truth tables shown in the drawings.

The reference signal ($F_A$) which may be the output of a local oscillator of known frequency (not shown) is connected to terminal 10 and thus is connected to the input $\bar{C}_A$ of flip-flop A. The feedback signal ($F_B$) is supplied to terminal 11 and thus to the input $\bar{C}_B$ of flip-flop B, the feedback signal being obtained over conductors 12 and 12A from the voltage controlled oscillator VCO. A frequency divider 12B may be connected in the feedback line 12, 12A. In response to the reference signal on terminal 10 and the feedback signal on terminal 11, by virtue of the various gates and transistor circuitry as described, an Analog Output Voltage $\Delta V_{BB}$ appears on terminal 13 (FIG. 1). The terminal 13 voltage is supplied to the voltage controlled oscillator, VCO, over conductor 14 and in response thereto the frequency generated by the VCO is transmitted over conductors 12 and 12A to the input terminal 11 of flip-flop B. The VCO may be selected to have the center point of its output frequency equal to that of the reference signal $F_A$ whereby excursions of the output frequency of the VCO may be upwardly or downwardly from its center frequency.

The $\bar{J}$ input of flip-flop A is connected through conductor 15 to terminal 16 which is connected to a logic "1" level voltage. Similarly the $\bar{K}$ and R inputs of flip-flop A are connected to conductor 17 and thus to the logic "0" level terminal 18. The $\bar{K}$ input of flip-flop B is connected to conductor 15 and thus to the logic "1" level terminal 16. Similarly, the $\bar{J}$ input and the S input of flip-flop B are connected to the conductor 17 and thus to the logic "0" level terminal 18.

The logic "0" level as used in the subject application means the low level of a signal and typically for example might be −1.6 volts or voltages more negative than that down to about negative 5.2 volts. Similarly the logic "1" level voltage is the high state of a signal and typically, according to the invention, such a voltage might be −0.75 volts which is to say substantially higher than −1.6 volts.

The S input of flip-flop A and the R input of flip-flop B are connected together through conductor 19 which is also connected to the output Z of NOR gate 1. S and R, as used in this specification, mean "set" and "reset", respectively. Thus as shown, when a signal Z appears at the output of gate 1, which signal would normally be a pulse, the same signal is applied to the set (S) input of flip-flop A and the reset (R) input of flip-flop B causing flip-flop A to take its initial or set position and causing flip-flop B to take its initial or reset position.

The $Q_A$ output of flip-flop A is connected through conductor 21 to one of the inputs of gate 1 and the $\bar{Q}_B$ output of flip-flop B is connected through conductor 22 to the other input of gate 1. The $\bar{Q}_A$ output of flip-flop A is connected through conductor 23 to one of the inputs of gate 2 and the output $\bar{Q}_B$ of flip-flop B is connected through conductor 24 as one input of gate 3. In the circuitry shown in solid lines with respect to flip-flops A and B and the gates 1, 2 and 3 the output $Q_B$ of flip-flop B is not used.

The output of gate 2, signal X, is connected through conductor 25 to one terminal of diode 26 whose other terminal is connected through conductor 27 to the base 28 of PNP transistor $Q_1$. The emitter 29 of the transistor $Q_1$ is connected through conductor 31 to ground as shown. The collector 32 of the transistor $Q_1$ is connected through conductor 33 to terminal 34 as shown. The base 28 of transistor $Q_1$ is also connected through conductors 27 and 35 to a 1K ohm resistor 36 and thus to ground as shown.

The output of gate 3, signal Y, is connected through conductor 37 to the base 38 of an NPN transistor $Q_3$, the emitter 39 of which is connected to terminal 41 and thus through conductor 42 to the base 43 of NPN transistor $Q_2$. The collector 44 of transistor $Q_3$ is connected to group as shown. The emitter 45 of transistor $Q_2$ is connected through conductor 46 to the −V terminal 47. The emitter 45 is also connected through conductor 46 and a resistor 48 through conductor 49 to terminal 41 (i.e., the base of transistor $Q_2$).

The 1K ohm resistor 36 and the resistor 48 of about 180 ohms are connected as shown respectively for appropriate biasing of the respective transistors and diode 26. The diode 26 is forward biased by the resistor 36, and resistor 48 acts as a base device resistor for transistor $Q_2$ and as a pulldown resistor for transistor $Q_3$.

The collector 51 of transistor $Q_2$ is connected through conductor 52 to terminal 34. Connected to terminal 34 is one terminal of a resistor 53 (R) the other terminal of which is connected to one terminal of a capacitor 54 (C), the other terminal of which is grounded as shown. The juncture of resistor 53 and capacitor 54 is connected to the output terminal 13 giving the analog output voltage $\Delta V_{BB}$. The transistors $Q_1$ and $Q_2$ are connected in series between the −V terminal and ground, but the midpoint terminal 34 is connected to the resistor 53. As will become evident subsequently in this specification transistors $Q_1$ and $Q_2$ do not both conduct at the same time. When transistor $Q_1$ is conducting transistor $Q_2$ is non-conducting and the voltage on capacitor 54 moves upwardly that is to say the terminal 55 becomes less negative. Similarly, when transistor $Q_2$ is conducting transistor $Q_1$ is non-conducting and the charge on capacitor 54 moves downwardly, that is the voltage on terminal 55 becomes more negative. Transistors $Q_1$ and $Q_2$ are therefore in effect two current sources, one or the other of which is pulsed on for either pumping up the charge on capacitor 54 or pumping it down depending on whether the capacitor is being charged negatively or is being discharged toward ground.

The choice of the R and C values of resistor 53 and capacitor 54 depends upon the reference frequency used and system bandwidth required as will become clear. Typically these may be 100 ohms and 1 microfarad where the reference signal frequency is 1000 Hz.

The voltage controlled oscillator VCO may, for example, under the condition of operation where the integer N is of the frequency divider 12B is 1 have an output signal $F_B$ equal in frequency and phase to that of the reference frequency $F_A$. Under these conditions the output voltage at terminal 13 could typically be at the center of its permissible range shown in FIG. 3 as the value −V/2, wherein the full range of the values of $\Delta V_{BB}$ is from 0 to −V. In a typical apparatus according to the invention the value −V was −2.4 volts, although this value can be selected as desired.

Figure 2:
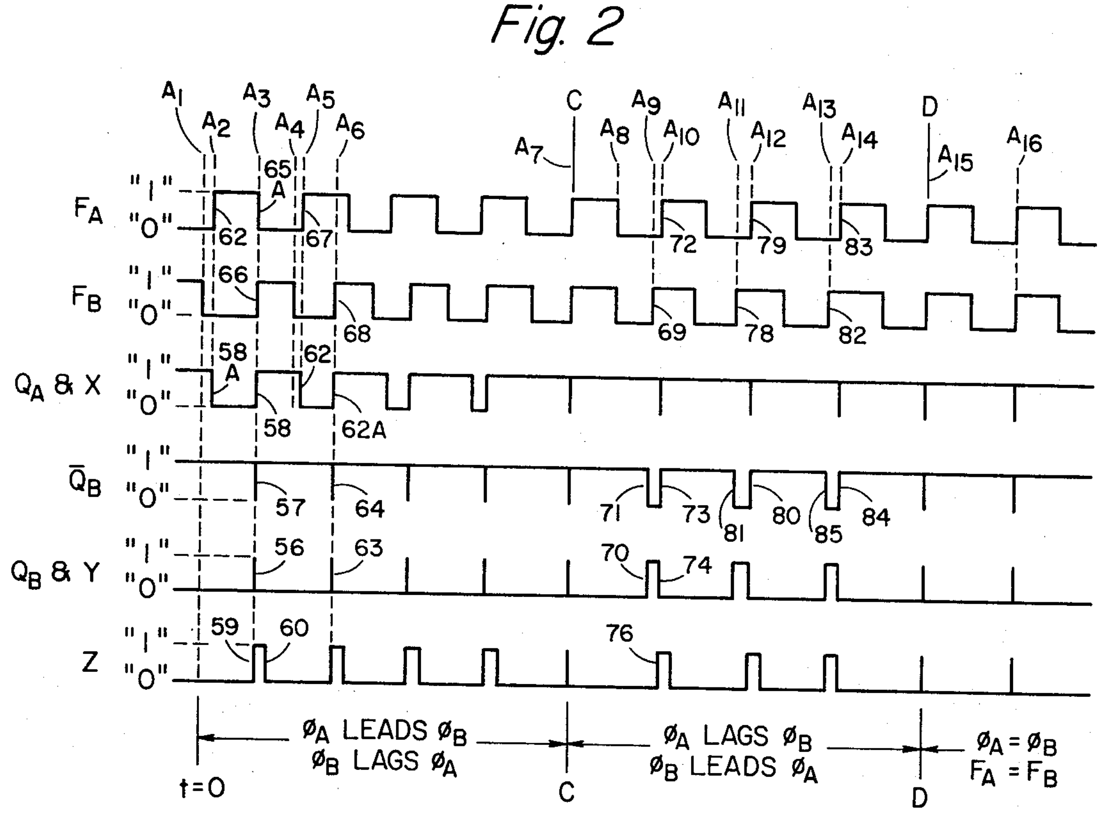
FIG. 2 is a series of graphs representing typical wave shapes at various points in the circuit of FIG. 1.

Referring to FIG. 2 the reference frequency $F_A$ is shown as a series of square wave pulses of a single frequency varying in magnitude between logical "0" and logical "1" magnitudes. The specific values of logical "0" and "1" are not significant and neither is the fact that a square wave is shown. Sine waves and other wave shapes would work equally well upon appropriate conditions. Similarly the feedback signal $F_B$ is shown as a series of square wave pulses of varying frequency and having magnitude values between logical "0" and logical "1". Also, signals appearing at $Q_A$ $\bar{Q}_A$, $Q_B$, $\bar{Q}_B$, X, Y and Z and at the S and R terminals respectively of flip-flops A and B are pulses having values of either logical "0" or logical "1".

The flip-flop A operates according to the clocked $\bar{J}$-$\bar{K}$ truth table of FIG. 6A and the R–S truth table of FIG. 7. In the truth table of FIG. 7 $Q^n$ refers to any output of the flip-flop at present time and $Q^{n+1}$ refers to the output at time later than present. Thus, on transition from "0" to "1" logic level of $F_A$ (connected to $\bar{C}_A$), the $\bar{J}$ and $\bar{K}$ fixed inputs being logical "1" and logical "0" respectively, flip-flop A, that is $Q_A$, clocks (changes state) from logical "1" to logical "0". For this transition, the input reference signal $F_A$ changes from logical "0" to logical "1". Correspondingly, $\bar{Q}_A$ being the complement of $Q_A$ changes from a logical "1" to logical "0". Only the S portion of the R-S truth table of FIG. 7 applies to flip-flop A since only the S input of this flip-flop is variable, the R input being tied to logical "0". Actually, only the "0" and "1" levels (conditions 1 and 2) of the R-S truth table of FIG. 7 apply to flip-flop A. Thus when the S input of flip-flop A, signal Z, is "0", the flip-flop occupies a state where $Q_A$ is equal to "1" or "0" depending upon whether the flip-flop A has clocked or not. But when the input at S of flip-flop A is a logical "1" as when signal Z is "1", flip-flop A sets to the state where $Q_A$ is equal to "1".

The flip-flop B operates according to the clocked $\bar{J}$-$\bar{K}$ truth table for flip-flop B as shown in FIG. 6B and according to the R-S truth table of FIG. 7.

Referring to FIG. 6B, on transition from "0" to "1" logic level of $F_B$ (connected to $\bar{C}_B$) the output $Q_B$ of flip-flop B changes from logical "0" to logical "1", $\bar{C}_B$ being the input signal $F_B$ and having changed from "0" to "1" in this instance. This is to say that flip-flop B clocks from logical "0" to logical "1" on transition from logical "0" to logical "1" of the input, the $\bar{J}$ and $\bar{K}$ inputs being tied to logical "0" and logical "1" levels respectively. Correspondingly the $\bar{Q}_B$ output of flip-flop B being the complement of $Q_B$ becomes logical "0" when $Q_B$ is at logical "1" and becomes logical "1" when $Q_B$ is at logical "0". Referring to the R-S truth table only the "0" and "1" levels (conditions 2 and 3) of the R column of the truth table apply to the flip-flop B since only the R input (reset) is variable, the S or (set) input being tied to the logical "0" level. Thus whenever the R input of flip-flop B, signal Z, is "0", the flip-flop B remains in its set position and $Q_B$ as well as $\bar{Q}_B$ remain at their last state unless clocking has taken place in the interim. However when the R input of flip-flop B is a logical "1", that is when signal Z is "1", flip-flop B resets to its state where $Q_B$ is "0" logical state and $\bar{Q}_B$ is a "1" logical state.

Referring to the truth tables of FIGS. 8A, 8B and 8C, it will be observed that gates 1, 2 and 3 connected as shown are functioning as NOR gates. For example, in FIG. 8A the two inputs of gate 1 are $Q_A$ and $\bar{Q}_B$, and for all combinations of logical "1" and logical "0" gate inputs of $Q_A$ and $\bar{Q}_B$, the output, signal Z, is logical "0" except where $Q_A$ and $\bar{Q}_B$ are both "0" at which time the output signal Z is a logical "1". Similarly in the case of gate 2 (FIG. 8B) where the inputs are the signal Z and $\bar{Q}_A$ and the output is the signal X. X is "0" for all combinations of Z and $\bar{Q}_A$ inputs except when both of these inputs are "0" at which point the signal X is a logical "1". In FIG. 8B, the state of conduction of transistor $Q_1$ is also given in relationship to the signal X. Thus whenever signal X is a logical "0" transistor $Q_1$ is biased on but when the signal X is a logical "1" transistor $Q_1$ is biased OFF. In this instance logical "0" may have a value of −1.6 volts and logical "1" may have a value of −0.75 volts as already described.

Since the silicon diode 26 poled as shown is in series with the emitter base junction of transistor $Q_1$ and ground, and $Q_1$ is a PNP transistor, the output of gate 2, signal X, must be negative with respect to ground by a voltage equal to the sum of the turn-on voltage of the emitter base junction of $Q_1$ and the voltage drop of diode 26. Logical "0" for signal X being −1.6 volts, for example, is more negative than logical "1", −0.75 volts transistor $Q_1$ is biased on when signal X is at logical "0".

Referring to FIG. 8C, the truth table for gate 3 it will be noted that when the inputs, signal Z and $\bar{Q}_B$, are either "0" or "1" the output signal Y is "0" and when both signal Z and $\bar{Q}_B$ are "0", the output signal Y is a logical "1". In FIG. 8C as well, the conduction state of transistor $Q_2$ is given in relationship to the signal Y at the output of gate 3. Thus transistor $Q_2$ is biased OFF in all instances where the signal Y is logical "0" that is its low state, but is biased ON when signal Y is logical "1", that is its high state. The base emitter junctions of transistors $Q_2$ and $Q_3$ are connected in series between −V and the output of gate 3, and since these transistors are NPN transistors the voltage at the base of transistor $Q_3$, namely signal Y, must be more positive by the value of two base emitter junction voltage drops for the transistor $Q_2$ to be biased ON. This is achieved when the signal Y is at its logical "1", that is its high state, or −0.75 volts as compared with logical "0" or −1.6 volts.

Figure 3:
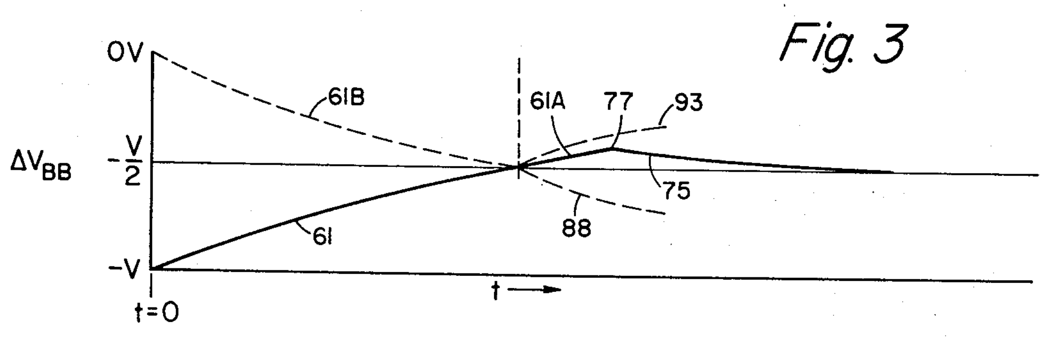
FIG. 3 is a graph exemplary of certain operative conditions of an embodiment of the invention and useful in the explanation thereof.

With the foregoing description of structure and operation in mind, the operation of the circuit of FIG. 1 in connection with the wave forms of FIG. 2 and the charging and discharging of capacitor 54 according to the graph of FIG. 3 may be undertaken.

Referring to FIG. 2 it will be observed that at zero time or $t=0$, point A1, the reference signal $F_A$ is at logical "0", the feedback signal $F_B$ is at the point of transition from logical "1" to logical "0". Since $F_A$ is at "0" state, flip-flop A has not yet clocked, i.e. changed state, the output $Q_A$ is at its high level or "1" state. While the feedback signal $F_B$ is changing from its "1" to "0" values, flip-flop B does not change position because clocking takes place only on transition from "0" state to a "1" state as described, whereby $Q_B$ remains at its logical "0" level and $\bar{Q}_B$ remains at its "1" level, being the complement of $Q_B$. The inputs to gate 1 being $Q_A$ = "1" and $\bar{Q}_B$ = "1" the output signal Z is equal to "0" (condition 4 of FIG. 8A) leaving flip-flops A and B in their existing states. Under this condition the input signals to gate 2 are Z = "0" and $\bar{Q}_A$ = "0" ($\bar{Q}_A$ is the complement to $Q_A$ which is "1"). This is condition 1 for gate 2, both inputs "0", whereby the output X is a logical "1" and the conducting condition of transistor $Q_1$ is OFF. The inputs to gate 3 are signal Z = "0" and $\bar{Q}_B$ = "1" ($\bar{Q}_B$ is a complement of $Q_B$ which is at "0"). This is condition 3 for gate 3, whereby its output signal Y is "0" and the conducting state of transistor $Q_2$ is OFF. Under this condition no charge is taken from capacitor C or fed into it and its voltage remains the same which under the assumed conditions is at its maximum negative value $-V$, $t = 0$ in FIG. 3.

In the area being considered that is to the left of the dividing line, C—C the phase $\phi_A$ of the reference signal leads the phase $\phi_B$ of the feedback signal, or $\phi_B$ lags $\phi_A$. In addition, the frequency and phase of the feedback signal $F_B$ is shown as varying somewhat.

At the point $A_2$ the reference signal $F_A$ ($\bar{C}_A$) is changing from its "0" to its "1" state which causes flip-flop A to clock, and according to the truth table of FIG. 6A, $Q_A$ clocks from "1" to "0" level. The flip-flop B remains in its position at this intant because $F_B$ is at "0". $Q_A$ becomes "0" whereby the inputs to gate 1 are $Q_A$ = "0" and $\bar{Q}_B$ = "1" whereby signal Z is "0", condition 3 of FIG. 8A. The inputs to gate 2 are Z = "0" and $\bar{Q}_A$ = "1" (being the complement of $Q_A$ which became "0") and the output signal X is equal to "0". This is condition 3 of FIG. 8B. Transistor $Q_1$ is biased ON and begins to conduct. The inputs to gate 3 are Z = "0" and $\bar{Q}_B$ = "1" whereby the output signal Y is "0". This is condition 3 of FIG. 8C and the transistor $Q_2$ is OFF.

Referring now to point $A_3$ of FIG. 2, the reference signal $F_A$ changes from its "1" level to its "0" level and the feedback signal $F_B$ clocks from "0" level to its "1" level. The outputs $Q_A$ and $\bar{Q}_A$ of flip-flop A do not change as a result of the change in the input signal level ($\bar{C}_A$) from the "1" level to the "0" level since these change only when flip-flop A clocks from its "0" level to its "1" level. However, flip-flop B clocks on the rising of its input signal $F_B$ from "0" to "1" level whereby the output signal $Q_B$ clocks from its "0" to its "1" level as shown by the positive spike 56. At the same time $\bar{Q}_B$ changes from its "1" level to its "0" level as shown by the negative spike 57. Momentarily then the inputs to the gate 1 are $Q_A$ = "0" and $\bar{Q}_B$ = "0". The output Z is therefore a logical "1" which is condition 1 shown in FIG. 8A. The "1" output of Z is supplied over conductor 19 to the S input of flip-flop A and the R input of flip-flop B causing the flip-flop A to set to its original position and flip-flop B to reset to its original position. These latter cause the $Q_A$ output of flip-flop A to move from its "0" to its "1" position and $\bar{Q}_B$ to move from its "0" position to its "1" position as shown by the rising edge 58 of $Q_A$ and the spike 57. Accordingly, after the appearance of the "1" pulse at Z and the supply thereof to the S input of flip-flop A and the R input of flip-flop B the signal Z shows a rise from "0" level to "1" level by the rising edge 59 of the pulse shown in FIG. 2. After the setting and resetting of flip-flops A and B, respectively, the input signals to gate 1 are $Q_A$ = "1" and $\bar{Q}_B$ = "1" whereby the output signal Z is again logical "0". This is condition 4 of gate 1 as shown in FIG. 8A. The change from "1" to "0" of the signal Z is shown by the falling edge 60 of the Z pulse.

The time interval between rising and falling edges 59 and 60, respectively, is exaggerated and actually is only the time interval between the appearance of the rising pulse Z, the operating time of flip-flops A and B and the additional operating time of gate 1. The total of these is a matter of a few nanoseconds ($10^{-9}$ seconds) in the fastest apparatus. Similarly the spikes 56 and 57 are of even shorter duration and represent the clocking time involved for flip-flops A and B. In the setting process of flip-flop A, $Q_A$ became "1" and correspondingly $\bar{Q}_A$ became "0".

Since signal Z is also "0" the two inputs of gate 2 are "0" and "0" whereby the output signal X is "1" as shown by condition 1 of FIG. 8B. Accordingly, transistor $Q_1$ is biased OFF since the voltage available on conductor 25 under this condition is −0.75 volts which is insufficient to bias $Q_1$ ON. Thus it is noted that while transistor $Q_1$ was conducting from point $A_2$ as caused by the clocking of flip-flop A, $Q_1$ is turned off at point $A_3$ by the set and and reset pulse Z delivered by gate 1, this occurring because of the clocking of flip-flop B in response to the rising of the feedback signal $F_B$ from its "0" to its "1" level. In this instance, the rise of the reference signal $F_A$ turns the transistor $Q_1$ ON and the rise of the feedback signal $F_B$ turns the transistor $Q_1$ OFF. Prior to the rise at point $A_3$ of feedback signal $F_B$ the gate 3 was off, because the gate input signals were "1" and "0". After the resetting of flip-flop B the input signals to gate 3 are again $\bar{Q}_B$ = "1" and Z = "0" whereby the output signal Y is equal to "0" as shown by condition 2 of FIG. 8C. Accordingly, the transistor $Q_2$ remains OFF. The only signal involvement or change being the spike 56 of extremely short duration which caused no change in the charge on capacitor C.

Since transistor $Q_1$ has been ON in the time interval between $A_2$ and $A_3$, the falling and rising edges 58A and 58 of pulse $\phi_A \xi X$, the charge on capacitor 54 has changed because of the conducting circuit extending from ground through capacitor 54, resistor 53, conductor 33, transistor $Q_1$ and conductor 31 to ground. Since it was assumed that the capacitor 54 had its maximum negative charge, the conduction as described causes negative charge to discharge off whereby the voltage on capacitor 54 rises as shown by the rising portion 61 of the capacitor charge and discharge graph.

The change in the charge on capacitor 54 of course reflects itself in a change in the voltage at terminals 55 and 13 which in turn causes a change in the output frequency of the VCO. The latter causes a corresponding change in frequency and/or phase of the feedback signal as received by the flip-flop B at $\bar{C}_B$. That is to say because of the feedback loop including conductor 14, VCO, and conductor 12 the circuit is attempting to correct the discrepancy in frequency and phase between the reference signal $F_A$ and the feedback signal $F_B$.

At the point $A_4$ feedback signal $F_B$ changes from its "1" level to its "0" level but this causes no change in the output $Q_B$ and $\bar{Q}_B$ of flip-flop B as already explained. Likewise no changes take place in the output signals $Q_A$ and $\bar{Q}_A$ of flip-flop A all as may be observed by considering the graphs in FIG. 2.

While the curve 61 has been shown as being smooth, it will contain a ripple whose magnitude is determined by the time constant of the RC (53, 54) network. Under the conditions described in this application the time constant relative to the frequency is such that any ripple has been smoothed out.

The transistors $Q_1$ and $Q_2$ remain off in the interval between $A_3$ and $A_4$.

At the point $A_5$ of the reference signal $F_A$, and also the time scale t, the reference signal changes from "0"

of FIG. 8C. As shown for this condition in FIG. 8C the transistor $Q_2$ turns on. As already explained under this condition earlier in this specification when signal Y has a "1" value the voltage on conductor 37 that is on the base 38 of transistor $Q_3$ is −0.75 volts, typically. This is sufficiently more positive than the base emitter voltage drops of $Q_2$ and $Q_3$ in series relative to the negative voltage of terminal 47 for $Q_2$ to be biased ON. As $Q_2$ begins to conduct as shown by the rising edge 70 of the $Q_B$ and Y pulse of FIG. 2, transistor $Q_1$ remains OFF because the signal X of gate 2 is at a "1" level. The latter is because the inputs to gate 2 are signal Z = "0" and $\bar{Q}_A$ = "0" also, that is condition 1 shown on FIG. 8B. Signal X being "1" the voltage on conductor 25 is at its high state namely −0.75 volts which is insufficient to bias PNP transistor $Q_1$ ON in the presence of diode 26 and the emitter base junction of transistor $Q_1$.

Transistor $Q_2$ conducting at point $A_9$ continues to conduct until the time point $A_{10}$ at which time the reference signal $F_A$ changes from its "0" level to its "1" level as shown for convenience by the reference character 72. Since flip-flop A clocks on the change from "0" to "1" level of $F_A$, $Q_A$ changes momentarily from a "1" level to a "0" level and $\bar{Q}_A$ changes momentarily from a "0" level to a "1" level. Momentarily then, at this point, gate 1 has inputs $Q_A$ = "0" and $\bar{Q}_B$ = "0" giving an output signal Z equal to "1", condition 1 as shown in FIG. 8A. Signal Z being "1", causes flip-flops A and B to set and reset respectively whereby $Q_A$ changes to a "1", $\bar{Q}_A$ changes to a "0" and $\bar{Q}_B$ to a "1" as seen from FIG. 2 for convenience by the reference character 73. The setting and resetting of flip-flops A and B under this condition changes the inputs to gate 1 to $Q_A$ = "1" and $\bar{Q}_B$ = "1" giving a signal Z output = "0". Gate 3 thus has inputs Z = "0" and $\bar{Q}_B$ = "1" giving an output signal Y = "0" and $Q_2$ is biased OFF. As previously explained, when signal Y equals "0" the voltage on conductor 37 is typically −1.6 volts which is insufficient to bias transistor $Q_2$ ON when the emitter base junctions of $Q_2$ and $Q_3$ are in series and connected to −V.

While transistor $Q_2$ was conducting between time points $A_9$ and $A_{10}$ as shown by the reference characters 70 and 74 a negative charge was flowing into capacitor 54 through the circuit extending from terminal 47 through transistor $Q_2$, conductor 52, resistor 53, and capacitor 54 to ground. The increase in negative charge on capacitor 54 causes a change in the voltage at terminal 13. Such voltage applied to VCO causes the frequency and/or phase of the output signal which is transmitted over conductor 12 to terminal 11 and flip-flop B to correct in the direction of bringing the two phases back toward equality and to increase the negative charge on capacitor 54 as shown by the portion 75 of the charging and/or discharging curve shown in FIG. 3. Under the conditions presently being considered where $\phi_A$ lags $\phi_B$, it will be observed that the rising edge 69 of the feedback signal turns transistor $Q_2$ ON and the rising edge 72 of the reference signal turns transistor $Q_2$ OFF. The phase angle represented by the rising edges 69 and 72 between the feedback signal and the reference signal represents an overshoot or over-correction in the operation of the feedback loop. The amount of overshoot is dependent to the value of the RC product, called the time constant or system response time.

The pulse 76 of signal Z as shown in FIG. 2 represents the time delays occurring in the operation of the flip-flops A and B and the gate 1 as already described.

The point of maximum discharge of capacitor 54 represented by the portions 61 and 61A of the curve occurs at point 77 as determined by the amount of over-correction referred to. At point $A_9$, rising edge 70, the transistor $Q_2$ begins to conduct and the capacitor begins to build up its charge negatively as shown by the portion 75 of the curve.

The next time point of significance is $A_{11}$ at which time the feedback signal rises from "0" to "1" level as represented for convenience by the reference character 78. In the interval between points $A_{10}$ and $A_{11}$ the change from "1" to "0" of both reference signals and feedback signals causes no changes in the state of the flip-flops A and B or their outputs.

As previously described in connection with the rising edge 69 of the feedback signal from "0" to "1" the same changes in the outputs $Q_B$ and $\bar{Q}_B$ of flip-flop B occur at the rising edge 78. Thus $\bar{Q}_B$ changes from "1" to "0" while $Q_A$ and $\bar{Q}_A$ of flip-flop A remain the same as they were. At this point the inputs to gate 3 are Z = "0" and $\bar{Q}_B$ = "0" giving an output signal Y equal to "1" whereby transistor $Q_2$ turns on and conducts. At the time point $A_{12}$ the reference signal rises from "0" to "1" as shown for convenience by the reference character 79, flip-flop A changes its output, that is to say clocks, whereby $\bar{Q}_A$ changes momentarily from "1" to "0" and $Q_A$ changes momentarily from "0" to "1". As previously described in connection with the rise of reference signal at 72, the gate 1 at rise 79 acquires inputs $Q_A$ = "0" and $\bar{Q}_B$ equal to "0" whereupon output Z is a "1" and flip-flop A sets and flip-flop B resets. Accordingly output signal Z becomes "0" whereupon gate 3 has inputs Z = "0" and $\bar{Q}_B$ = "1" and the signal Y becomes "0" causing transistor $Q_2$ to cut off as shown by the reference character 80. In this instance also the rising edge 78 of feedback signal turns transistor $Q_2$ ON and the rising edge 79 of the reference signal turns transistor $Q_2$ OFF, conduction taking place in the interval between the points $A_{11}$ and $A_{12}$ as shown by the reference characters 81 and 80 as well. During this interval transistor $Q_1$ remains OFF as will be understood from previous explanations of the inputs to gate 2.

Capacitor 54 becomes more negatively charged during the interval between points $A_{11}$ and $A_{12}$ as represented by the width of pulse 81, 80. Accordingly the portion of the capacitor charging curve 75 continues to decrease toward its midpoint value as shown in FIG. 3. The phase angle represented by the spacing between rising edges 78 and 79 is larger than that represented by the spacing between rising edges 69 and 72 indicating that over-correction has still taken place and that the lagging phase of the reference signal with respect to the feedback signal has increased in magnitude.

The next significant point in the operation of the device may be visualized as occurring at the time point $A_{13}$. Between points $A_{12}$ and $A_{13}$ both transistors $Q_1$ and $Q_2$ are OFF and the changes from "1" level to "0" level of both reference signal and feedback signal causes no change in the outputs of the flip-flops A and B or the various gates.

level to "1" level and flip-flop A clocks as described whereby its output $Q_A$ changes from a "1" level to a "0" level and correspondingly its output $\bar{Q}_A$ changes from a "0" level to a "1" level. As described under these circumstances the inputs to gate 1 are $Q_A$ = "0" and $\bar{Q}_B$ = "1" whereby the output Z is "0" as may be determined by condition 3 of the truth table, FIG. 8A. The inputs to gate 2 however are Z = "0" and $\bar{Q}_A$ = "1" whereby the output signal X is logical "0" as seen from condition 3 of FIG. 8B and the transistor $Q_1$ is biased ON as described (falling edge 62 of $Q_A$ and X). The transistor $Q_2$ remains OFF because the signal Y remains at "0" level since the inputs to gate 3 are Z = "0" and $\bar{Q}_B$ = "1", condition 3 of FIG. 8C.

At time, point $A_6$, the flip-flop B input $\bar{C}_B$, feedback signal $F_B$, changes from "0" level to "1" level, that is clocks, whereby the output $Q_B$ changes momentarily from "0" level to "1" level as shown by positive spike 63 and the output $\bar{Q}_B$ changes momentarily from a "1" level to a "0" level as shown by the negative spike 64. As described in connection with the time point $A_3$ the output of gate 1, signal Z, momentarily changes from a "0" to a "1" whereby the flip-flops A and B set and reset following which the output of gate 1, signal Z, again becomes a "0". The setting of flip-flop A causes output $Q_A$ to change from "0" level to "1" level and the output $\bar{Q}_A$ to change from a "1 " level to a "0" level. As explained in connection with point $A_3$ transistor $Q_1$ turns off because the inputs to gate 2 are Z = "0" and $\bar{Q}_A$ = "0" which according to FIG. 8B gives a signal X equal to "1". Thus in the time interval of $A_4$ to $A_6$ (falling edge 62 and rising edge 62A of $Q_A$&X) the transistor $Q_1$ has been conducting and a further pulse of charge flows out of capacitor 54 as explained. Accordingly, the discharge curve 61 of capacitor 54 continues to rise as shown in FIG. 3. The change in charge on capacitor 54 appears as a change in the voltage at terminal 13 which as already explained causes a change in the frequency and/or phase of the signal being fed back through the feedback loop and appearing on terminal 11 entering the flip-flop B. As may be observed by comparing the rising edge 65 of $F_A$ at $A_2$ and the rising edge 66 of $F_B$ at $A_3$ with the rising edge 67 of $F_A$ at $A_5$ and the rising edge 68 of $F_B$ at $A_6$, the phase angle between reference signal $F_A$ and the feedback signal $F_B$ is steadily decreasing.

Between the time points $A_6$ and $A_7$ (line C—C) where at $A_7$ the reference signal $F_A$ rises from "0" level to "1" level at the same time that the feedback signal $F_B$ rises from "0" level to "1" level, that is the reference signal and the feedback signal are in phase, the changes in state which occur in flip-flops A and B and the gates 1, 2 and 3 may be determined by reference to FIG. 2 and the truth tables of FIGS. 6A and 6B, 7 and 8A, 8B and 8C as described. However it will be noted that the output pulses $Q_A$ of flip-flop A and the signal X pulses in the interval between time points $A_6$ and $A_7$ continue to decrease in width or time, indicating that the pulses of charge flowing out of capacitor 54 are successively decreasing as the feedback loop brings the feedback signal $F_B$ into phase and frequency correspondence with the reference signal. Accordingly, during this same interval the portion 61 of the charging graph of capacitor 54 continues to rise until at the point $A_7$ the charge thereon is at the midpoint of its range, namely $-V/2$.

In the area to the left of point $A_7$, $\phi_A$ the phase of the reference frequency led $\phi_B$ the phase of the feedback signal, but at the point $A_7$ the phases of these two signals are equal. In the interval between points $A_1$ and $A_7$, $\phi_A$ leading $\phi_B$, the rising edge from "0" level to "1" level of the reference signal $F_A$ turned the transistor $Q_1$ ON and the rise from "0" level to "1" level of the feedback signal $F_B$ turned transistor $Q_1$ OFF. The rising edge of the reference signal at point $A_2$ for convenience may be identified by the reference character 65 and the rising edge at point $A_3$ of the feedback signal $F_B$ may for similar convenience be identified by the reference character 66. Considering the interval between time points $A_2$ and $A_3$ as equal to 180° it will be noted that the rise portion 65 of $F_A$ leads the rising edge 66 of $F_B$ by 180°. Considering further that the falling edge of $F_A$ at time point $A_3$, which for convenience may be identified by the reference character 65A does not and of itself alter the state or condition of flip-flop A or its outputs, it will be realized that the rising edge 66 of feedback signal $F_B$ could occur at the point $A_5$, which is to say 360° from the point $A_2$. If the rise edge 66 should occur at the point $A_5$ where the reference signal $F_A$ rises, rising edge 67, the phase difference between the turning ON and OFF of transistor $Q_1$ can be 360° leading. Correspondingly, it will be evident that the rising edge 65 of $F_A$ and the rising edge 66 of $F_B$ may be closer to each other in time, for example, from any value to zero degrees leading. Thus when $\phi_A$ leads $\phi_B$, the difference in phase can be any value between 0° and 360° and the circuit will develop a corrective voltage across the capacitor 54 which after the expiration of a number of cycles dependent on the time constant of R, 53, and C, 54, will bring the reference frequency and the feedback frequency and/or phase into equality as shown by the time point $A_7$.

The circuit also functions in the instances where the phase $\phi_A$ of the reference frequency $F_A$ lags the feedback signal phase $\phi_B$ over the same range of 0° to 360°. This situation may be considered as one example of operation in connection with the wave forms of FIG. 2 and the charge and discharge graph of FIG. 3. For example, it may be assumed that the feedback loop, in correcting for the condition of $\phi_A$ leading $\phi_B$, overshoots and reduces the negative charge on capacitor 54 by an amount beyond the midpoint of its range for example along the continued rising portion 61A of the discharge curve. This is in the area wherein the phase angle of the reference signal lags the phase angle of the feedback signal. At the time point $A_8$ the falling edges of the reference signal and the feedback signal are very nearly in phase, but in any event the falling edges of these waves cause no changes in the states of the flip-flops A and B nor in their outputs.

At time point $A_9$, the feedback signal $F_B$ rises from "0" level to "1" level as shown for convenience by the reference character 69, the reference frequency $F_A$ still being at its "0" level. As $\bar{C}_B$ rises at 69, changing from "0" level to "1" level the B flip-flop changes its outputs, $Q_B$ going from "0" level to "1" level, rising edge 70, and $\bar{Q}_B$ going from a "1" level to a "0" level, falling edge 71. Under this condition the inputs to gate 1 are $\bar{Q}_B$ = "0" and $Q_A$ = "1" whereby the output signal Z is "0", condition 2 of FIG. 8A. Under this condition also, the inputs to gate 3 are Z = "0" and $\bar{Q}_B$ = "0" whereby the signal Y output is a logical "1", that is condition 1

At point $A_{13}$ the feedback signal rises as shown by the reference character 82 and as previously explained the rise 82 causes the transistor $Q_2$ to turn ON because the outputs of the flip-flop B change in this instance, $Q_B$ from "0" level to "1" level and $\bar{Q}_B$ from "1" to "0" levels. Gate 3 therefore inputs of "0" and "0" giving an output signal Y equal to "1". When reference signal rises as shown by reference character 83 the gate 1 receives "0" level signals on both its inputs causing the flip-flops A and B to reset to set and reset as at point $A_{12}$. The rise of reference signal at 83 turns off the transistor $Q_2$ as shown by the change from "0" to "1" to $\bar{Q}_B$ shown conveniently by the reference character 84. Since $Q_2$ conducted in the interval between times $A_{13}$ and $A_{14}$, i.e. between rising edges shown by the reference characters 82 and 83, the charge on capacitor 54 continues to increase negatively as shown by the decreasing portion 75 of the curve. The decrease in phase as represented by the spacing between the rising edges 82 and 83 or rising edge 84 and falling edge 85 indicates that the feedback circuit is bringing the phase of the reference signal and the feedback signal closer together. This is also evident from FIG. 3 where the curve 75 is approaching the midpoint range of the charge on capacitor 54.

At time points $A_{15}$ and $A_{16}$ the rising portions of both the reference frequency and the feedback signal change from "0" to "1" levels at the same time which is to say that the reference signal and the feedback signal are of the same frequency and are in phase during this period. That is to say, to the right of the line D-D of FIG. 2 the phase of A equals the phase of B and the frequency of the reference signal equals the frequency of the feedback signal. The various spike pulses shown for $Q_A$, $\bar{Q}_B$ and $Q_B$ in this area represent the functionings of the various gates as already described. It will be observed from FIG. 3 that to the right of the line D—D the curve 75 is flat and is at the midpoint $-V$ of the range. This means that the voltage at terminal 13, the input to the VCO, remains at its steady value.

Any deviations in the magnitude of the voltage at terminal 13 as may be caused by any reason will cause a correcting phase and/or frequency to occur on line 12 at the output of the VCO which then appears at the input $\bar{C}_B$ of the flip-flop B and thereby causes the correcting influences to take place as described irrespective of the direction in which the deviation occurs. It will be noted that the phase lag represented by the spacing between reference characters 69 and 72 on the one hand, 78 and 79 on the other and still further phase differences between the reference and feedback signals may be any value between 0° and 360° lagging inasmuch as the transistor $Q_2$ is turned on by the rising of the feedback signal and is turned off by the rising of the reference signal.

For most accurate results, the capacitor 54 must be of the type having very low leakage so that the VCO does not deviate from frequency or phase resulting in low spurious signal generation.

Considering the leading phase angle as well as the lagging phase angle characteristics, the turn on the turn off points of the transistors $Q_1$ and $Q_2$ occur with the rising edges of the reference and feedback signals. In effect the circuit compares the time interval of or detects the time interval between the two rising edges. Since both rising edges occur only once in each 360° period, the detecting process operates over this same period whether the angle is leading or lagging. It will be clear that other corresponding points of the wave forms may be selected for example the falling edges of the wave forms. The significant point is that each wave of the reference frequency and the feedback signal have only one of the characteristic points throughout the 360° interval. It is preferable that points of rapid change be available such as the rise or fall of a square wave.

The reference signal $F_A$ is supplied only to flip-flop A and gate 2 responding to the appropriate output from flip-flop A provides the signal for turning on the transistor $Q_1$. The only contribution made by flip-flop B, that is to say the feedback signal, to the functioning of the components associated with flip-flop A is in its setting state effected by gate 1 whereby the transistor $Q_1$ is turned OFF. Similarly the feedback signal is supplied only to flip-flop B and it is this flip-flop which supplies an appropriate signal to gate 3 to turn transistor $Q_2$ ON. The only contribution made by flip-flop A, that is to say the reference signal, to the functioning of the components associated with flip-flop B is in its resetting state effected by the operation of gate 1 whereby the transistor $Q_2$ is turned OFF.

Operation of the circuit under the conditions to the right of line C—C, where $\phi_B$ leads $\phi_A$ results in negative charge being pumped into capacitor 54. Thus it will be clear that the charge on capacitor 54, initially, may be zero and be pumped down along the dotted curve 61B to the midpoint range value of $-V/2$. If desired, the charging or discharging circuit to the right of dotted line A—A may be arranged for positive capacitor voltages.

Figure 5A:
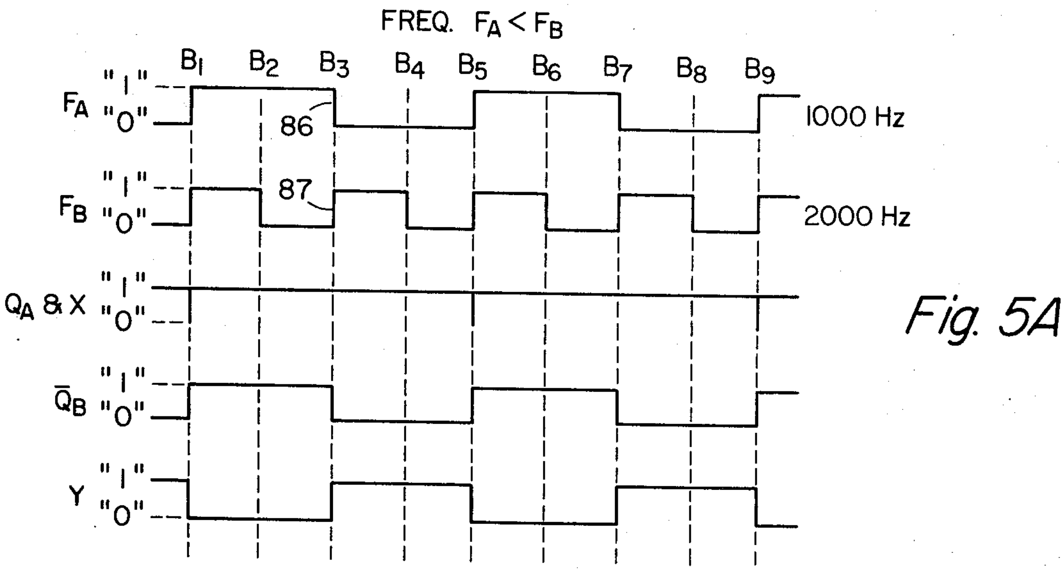
FIG. 5A is a series of graphs similar to FIG. 2 under another set of operating conditions.

In the consideration of the operation of the invention according to FIGS. 1 and 2 the essential characteristic was the phase between the rising edges of the reference signal and the feedback signal. Consideration will now be given to that portion of the operation wherein, on at least a temporary basis, the frequencies of the reference signal $F_A$ and of the feedback signal $F_B$ may be different, for example, $F_A$ may be less than $F_B$ by a factor of two as shown in FIG. 5A. For this purpose it is assumed initially that the voltage at point 13, that is the voltage on capacitor 54, is at the midpoint of its range, $\Delta V_{BB}$ equal to $-V/2$. Since, as shown in FIG. 5A, the reference signal $F_A$ and the feedback signal $F_B$ are starting in phase, time zero for the purposes of FIG. 5A may correspond to the center line C-C of FIGS. 2 and 3. That is the time zero or $B_1$ point of 5A corresponds to the time point $A_7$ of FIG. 2.

Referring more particularly to FIG. 5A both the reference signal and the feedback signal have risen from "0" to "1" states as a result of which both flip-flops A and B occupy their set and reset positions respectively. Consequently, $Q_A$ is at its "1" positions, $\bar{Q}_A$ is at its "0" position, $Q_B$ is at its "0" position and $\bar{Q}_B$ is at its "1" position. Correspondingly, the truth tables will establish that signal Z is "0" and the output signals X and Y of gates 2 and 3 are respectively "1" and "0" whereby both transistors $Q_1$ and $Q_2$ are OFF. This condition continues past the point $B_2$ to the point $B_3$ where the reference signal goes from "1" state to "0" state and the feedback signal goes from its "0" state to its "1" state, as shown by the falling edge and rising edge, identified respectively by the reference characters 86 and 87. The change from "1" to "0" states of the reference signal causes no change in the outputs of flip-flop A. However, the change from "0" to "1" states of the feedback signal causes flip-flop B to change its outputs $Q_B$ and $\bar{Q}_B$ to "1" and "0" states respectively. Under these circumstances, similarly to that considered in connection with the rising edge 69 of the feedback signal in FIG. 2, the inputs of gate 3 are Z = "0" and $\bar{Q}_B$ = "0" whereby the output signal Y is "1" and the transistor $Q_2$ turns ON and conducts.

The described condition continues past point $B_4$ where the reference signal remains unchanged and the feedback signal changes from "1" to "0" but causes no changes in flip-flop B outputs to point $B_5$ where the reference signal clocks from "0" to "1" and the feedback frequency clocks from "0" to "1" state. The $B_5$ point in time is the same as the $B_1$ point in time meaning, in effect in this instance, that the frequency of the feedback signal is twice that of the reference signal. At point $B_5$ the change of the reference signal from "0" to "1" causes the outputs $Q_A$ and $\bar{Q}_A$ of flip-flop A to change as previously described and thus set and reset flip-flops A and B. In the process, $Q_2$ is turned off inasmuch as the output $\bar{Q}_B$ of flip-flop B goes from "0" to "1" thereby providing the output signal Y of gate 3 equal to "0". This situation continues past the point $B_6$ where the feedback signal goes from its "1" state to its "0" state to point $B_7$ where the feedback signal goes from "0" to "1" state while the reference signal goes from "1" to "0" state.

Point $B_7$ is similar to point $B_3$ and, as explained there, the transistor $Q_2$ turns ON and stays ON past point $B_8$ where the feedback signal goes from "1" level to "0" level, with no change in the reference signal, to point $B_9$ where both reference signal and feedback signal change from "0" state to "1" state and transistor $Q_2$ turns OFF. The condition of the various elements at point $B_9$ is the same as at points $B_1$ and $B_5$.

During the operation from point $B_1$ to point $B_9$, the output of gate 1, signal X, is a "1", except for spikes and thus transistor $Q_1$ remains non-conducting.

Operation for additional repetitions of the reference signal and feedback signal would be as described if no changes in the feedback signal took place. The operation according to FIG. 5A wherein $F_A$ is greater than $F_B$ is analogous to the instance of FIGS. 2 and 3 where the phase $\phi_A$ lags $\phi_B$. Thus, $Q_2$ conducting during the time intervals $B_3$–$B_5$ and $B_7$–$B_9$ pumps down the charge on capacitor 54 that is increases its charge negatively. Operation is, therefore, along the dotted portion 88 of the curve of FIG. 3. If this condition continued unchanged the capacitor would pump down to its lowest level of charge and would stay there. However, referring to FIG. 1 for the condition described in FIG. 5A the integer N would be 2, for example. That is to say the output frequency of the VCO at the terminal 89 would become and remain at twice that of $F_A$ the reference signal. The frequency appearing on line 12A, while initially equal to twice the reference frequency or greater, at steady state however, is the frequency $F_{VCO}/N$, that is the frequency of the voltage controlled oscillator divided by the multiplier N, whereby the steady state frequency appearing on line 12A is equal to that of the reference frequency $F_A$. In this manner the regulating effects described in connection with FIG. 2 operate and the voltage across the capacitor 54 and appearing at terminal 13 pumps down to the point where the feedback signal frequency $F_B$ at terminal 11 is equal to that of the reference frequency $F_A$ at terminal 10 and regulation takes place around this point.

Figure 5B:
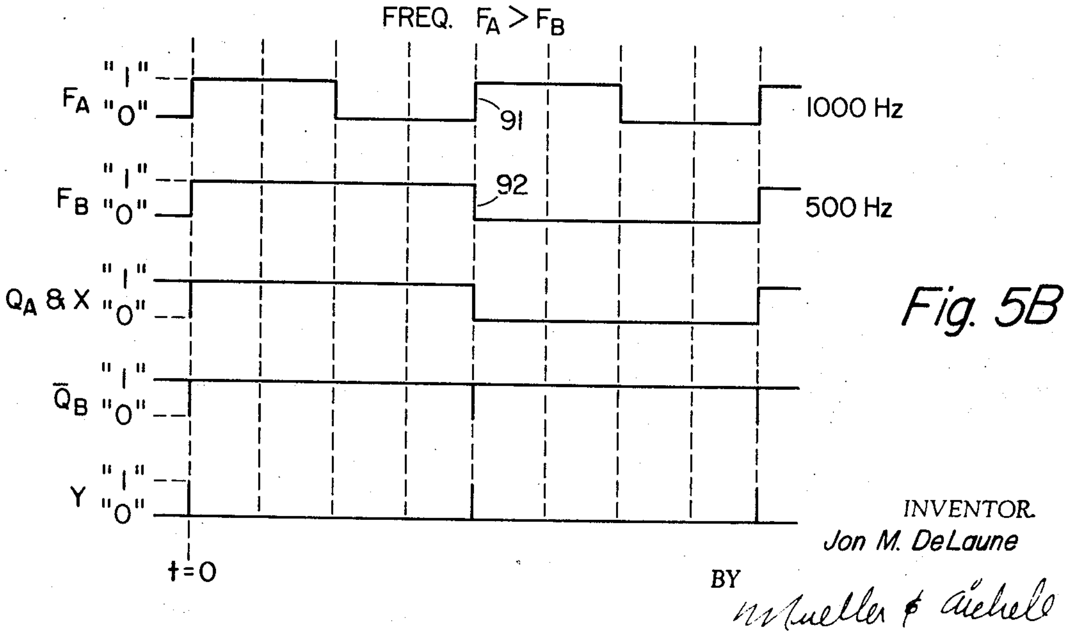
FIG. 5B is a series of graphs similar to FIGS. 2 and 5*a* under the still different set of operating conditions.

Referring to FIG. 5B, there is shown a condition wherein the feedback frequency $F_B$, on at least a temporary basis, is less than the reference frequency $F_A$ by a factor of 2 to 1. Under this condition, the reference signal and the feedback signal are shown, at time zero, as being in phase similar to FIG. 5A.

At point $B_1$ both flip-flops A and B have set and reset respectively to their appropriate states where the output signal $Q_A$ is at its "1" level, and the output signal $\bar{Q}_B$ is at its "1" level. Signal Z is therefore "0" and both transistors $Q_1$ and $Q_2$ are OFF, as previously explained, nothing will occur under the present set of circumstances until the point $B_5$ where the reference signal clocks from "0" state to "1" state and the feedback signal changes from "1" state to "0" state as shown by the rising and falling edges 91 and 92, respectively. Under these conditions the transistor $Q_1$ turns ON and transistor $Q_2$ remains OFF. Transistor $Q_1$ continues to conduct from the point $B_5$ until the point $B_9$ where both the reference signal and the feedback signal clock from their "0" states to their "1" states and the transistor $Q_1$ turns OFF.

As was explained in connection with FIG. 2 when the transistor $Q_1$ conducts the voltage on capacitor 54 pumps up and the circuit would be operating on that portion of the curve shown as 93 in FIG. 3. If operation in this fashion were to be continued unchanged the capacitor would ultimately reach zero voltage and operation would effectively cease. However, utilization of the voltage controlled oscillator, VCO, and the frequency divider 12B in the feedback loop maintain operation such that the reference signal $F_A$ at terminal 10 and the feedback signal $F_B$ at terminal 11 approach and ultimately achieve the condition of being in phase and at the same frequency with the voltage at terminal 13 assuming an appropriate value.

Figure 4:
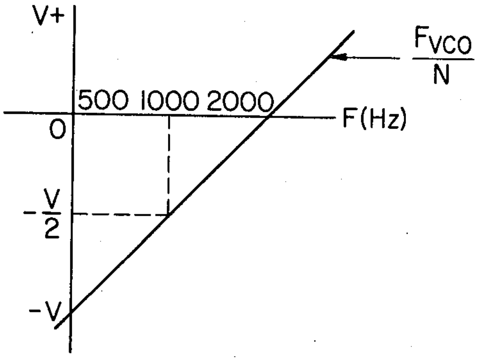
FIG. 4 is another graph useful in explaining the operation of the invention.

Referring to FIG. 4 there is shown, for example, a typical characteristic of a voltage controlled oscillator operating over the frequency range of 500–2000 Hz with voltage input varying from 0 to −V. The midpoint of the voltage range being −V/2, it is assumed that the frequency of the voltage controlled oscillator, $F_{VCO}$, with this voltage input would be about 1000 Hz. Under start up conditions after a long period of time, the voltage on capacitor 54 might, for example, be zero and under these conditions the voltage controlled oscillator might generate 2000 Hz as shown. As the 2000 Hz frequency is fed back through the loop 12, 12A to the input $\bar{C}_B$ of the flip-flop B, the regulating effects as described in connection with FIGS. 2 and 5A would take place until the operation stabilized at a frequency of 1000 Hz for the voltage controlled oscillator which is also the reference frequency $F_A$, it being assumed that N equals 1. At this point the capacitor 54 will have pumped down to the midpoint of its voltage range.

While gates 1, 2 and 3 are shown and described as NOR gates, AND gates may be used, wherein a logical "1" output is obtained only when both logical inputs are equal to "1" at the time of decision and a logical "0" output is obtained for all other combinations of inputs, i.e., "0"—"0", "1"—"0" and "0"—"1". For AND gating a conductor 94, shown dotted, would connect $Q_A$ to one input of gate 2; a conductor 95, shown dotted, would connect $\bar{Q}_A$ to one input of gate 1, conductors 21 and 23 being eliminated; a conductor 96 would connect $Q_B$ to the other input of gate 1; and a conductor 97 would connect $Q_B$ to one input of gate 3, conductors 22 and 24 being eliminated.

What is claimed is:

1. A digital control circuit for comparing relative time positions of corresponding portions of first and second external time varying signals comprising:
   - a first $\bar{J}$-$\bar{K}$ flip flop having two stable states and having a first two logic level input means, a set input means, a reset input means, a signal input means, and an output signal means, one of said first two logic level input means energized at one logic level, and the other of said first two logic level input means energized at a second logic level;
   - the signal input means of said first $\bar{J}$-$\bar{K}$ flip flops connected to directly receive, of said first and second external time varying signals, only said first external time varying signal;
   - said first $\bar{J}$-$\bar{K}$ flip flop being adapted in one of its stable states to provide, in response to the occurrence of said corresponding portion of said first external time varying signal, a first output signal on the output signal means of said first $\bar{J}$-$\bar{K}$ flip flop;
   - a second J-K flip flop having two stable states and having a second two logic levels input means, a set input means, a reset input means, a signal input means, and an output signal means, one of said second two logic input means energized at one logic level, and the other of said two logic means energized at a second logic level;
   - the signal input means of said second $\bar{J}$-$\bar{K}$ flip flop connected to directly receive, of said first and second external time varying signals, only said second external time varying signal;
   - said second $\bar{J}$-$\bar{K}$ flip flop being adapted in one of its states to provide, in response to the occurrence of said corresponding portion of said second external time varying signal, a second output signal on the output signal means of said second $\bar{J}$-$\bar{K}$ flip flop;
   - said one of said first two logic level input means and said one of said second two logic level means connected together;
   - said other one of said first two logic level input means, the reset input means of said first $\bar{J}$-$\bar{K}$ flip flop, said other one of said second two logic level input means, and the set input means of said second $\bar{J}$-$\bar{K}$ flip flop connected together;
   - logic means for comparing said first and second output signals and providing a change of state output signal upon the occurrence of the second one of said corresponding portions of said first and second external time varying signals; and
   - means for applying said change of state signal to the set input means of said first $\bar{J}$-$\bar{K}$ flip flop and to the reset input means of said second $\bar{J}$-$\bar{K}$ flip flop.

2. A digital control circuit for comparing relative time positions of corresponding portions of first and second external time varying signals comprising:
   - a first $\bar{J}$-$\bar{K}$ flip flop having two stable states and having a first two logic level input means, a set input means, a reset input means, a signal input means, an output signal means, and a complementary output signal means, one of said first two logic level input means energized at one logic level, and the other of said first two logic level input means energized at a second logic level;
   - the signal input means of said first $\bar{J}$-$\bar{K}$ flip flops connected to directly receive, of said first and second external time varying signals, only said first external time varying signal;
   - said first J-K flip flop being adapted in one of its stable states to provide, in response to the occurrence of said corresponding portion of said first external time varying signal, a first output signal on the output signal means of said first $\bar{J}$-$\bar{K}$ flip flop and the complement of said first output signal on the complementary output signal means of said first $\bar{J}$-$\bar{K}$ flip flop;
   - a second $\bar{J}$-$\bar{K}$ flip flop having two stable states and having a second two logic levels input means, a set input means, a reset input means, a signal input means, an output signal means, and a complementary output signal means, one of said second two logic input means energized at one logic level, and the other of said two logic means energized at a second logic level;
   - the signal input means of said second $\bar{J}$-$\bar{K}$ flip flop connected to directly receive, of said first and second external time varying signals, only said second external time varying signal;
   - said second $\bar{J}$-$\bar{K}$ flip flop being adapted in one of its stable states to provide, in response to the occurrence of said corresponding portion of said second external time varying signal, a second output signal on the output signal means of said second J-K flip flop and the complement of said second output signal on the complementary output signal means of said second $\bar{J}$-$\bar{K}$ flip flop;
   - said one of said first two logic level input means and said one of said second two logic level means connected together;
   - said other one of said first two logic level input means, the reset input means of said first $\bar{J}$-$\bar{K}$ flip flop, said other one of said second two logic level input means, and the set input means of said second $\bar{J}$-$\bar{K}$ flip flop connected together;
   - logic means for comparing one of said first output signal and the complement of said first output signal with one of said complements of said second output signal and said second output signal, respectively, and providing a change of state output signal upon the occurrence of the second one of said corresponding portions of said first and second external time varying signals; and
   - means for applying said change of state signal to the set input means of said first $\bar{J}$-$\bar{K}$ flip flop and to the reset input means of said second $\bar{J}$-$\bar{K}$ flip flop.

3. A digital control circuit for comparing relative time positions of corresponding portions of first and second external time varying signals comprising:
   - a first $\bar{J}$-$\bar{K}$ flip flop having two stable states and having a first two logic level input means, a set input means, a reset input means, a signal input means, and an output signal means, one of said first two logic level input means energized at one logic level, and the other of said first two logic level input means energized at a second logic level;

the signal input means of said first J-K̄ flip flop connected to directly receive, of said first and second external time varying signals, only said first external time varying signal;

said first J-K̄ flip flop being adapted in one of its stable states to provide, in response to the occurrence of said corresponding portion of said first external time varying signal, a first output signal on the output signal means of said first J-K̄ flip flop;

a second J-K̄ flip flop having two stable states and having a second two logic levels input means, a set input means, a reset input means, a signal input means, and an output signal means, one of said second two logic input means energized at one logic level, and the other of said two logic means energized at a second logic level;

the signal input means of said second J-K̄ flip flop connected to directly receive, of said first and second time varying signals, only said second external time varying signal;

said second J-K̄ flip flop being adapted in one of its stable states to provide in response to the occurrence of said corresponding portion of said second external time varying signal, a second output signal on the output signal means of said second J-K̄ flip flop;

said one of said first two logic level input means and said one of said second two logic level means connected together;

said other one of said first two logic level input means, the reset input means of said first J-K̄ flip flop, said other one of said second two logic level input means, and the set input means of said second J-K̄ flip flop connected together;

logic means for comparing said first and second output signals and providing a change of state output signal upon the occurrence of the second one of said corresponding portions of said first and second external time varying signals;

further logic means responsive to said first and said second output signals for controlling an analog voltage in accordance with the time interval between said corresponding portions of said first and second external time varying signals; and means for applying said change of state signal to the set input means of said first J-K̄ flip flop and to the reset input means of said second J-K̄ flip flop.

4. A digital control circuit for comparing relative time positions of corresponding portions of first and second external time varying signals comprising:

a first J-K̄ flip flop having two stable states and having a first two logic level input means, a set input means, a reset input means, a signal input means, and an output signal means, one of said first two logic level input means energized at one logic level, and the other of said first two logic level input means energized at a second logic level;

the signal input means of said first J-K̄ flip flops connected to directly receive, of said first and second external time varying signals, only said first external time varying signal;

said first J-K̄ flip flop being adapted in one of its stable states to provide, in response to the occurrence of said corresponding portion of said first external time varying signal, a first output signal on the output signal means of said first J-K̄ flip flop;

a second J-K̄ flip flop having two stable states and having a second two logic levels input means, a set input means, a reset input means, a signal input means, and an output signal means, one of said second two logic input means energized at one logic level, and the other of said two logic means energized at a second logic level;

the signal input means of said second J-K̄ flip flop connected to directly receive, of said first and second external time varying signals, only said second external time varying signal;

said second J-K̄ flip flop being adapted in one of its stable states to provide, in response to the occurrence of said corresponding portion of said second external time varying signal, a second output signal on the output signal means of said second J-K̄ flip flop;

said one of said first two logic level input means and said one of said second two logic level means connected together;

said other one of said first two logic level input means, the reset input means of said first J-K̄ flip flop, said other one of said second two logic level input means, and the set input means of said second J-K̄ flip flop connected together;

logic means for comparing said first and second output signals and providing a change of state output signal upon the occurrence of the second one of said corresponding portions of said first and second external time varying signals, further logic means responsive to said first and said second output signals for controlling an energizing circuit to supply an analog voltage member in accordance with the time interval between said corresponding portions of said first and said second external time varying signals; and means for applying said change of state signal to the set input means of said first J-K̄ flip flop and to the reset input means of said second J-K̄ flip flop.

5. A digital control circuit according to claim 4 wherein said further logic means comprises one logic device responsive to said first output signal and a second logic device responsive to said second output signal; said energizing circuit comprises a series circuit for first transistor responsive to an output signal from said one logic device, a second transistor responsive to an output signal from said second logic device and a voltage source thereacross; and said analog voltage member comprises a capacitor and resistor connected between one terminal of said voltage source and the juncture of said first and second transistors.

6. A digital control circuit for detecting the relative phase between an external time varying signal and an external time varying signal responsive to such phase which is fed back from the output of such circuit comprising:

a first J-K̄ flip flop having two stable states and having a first two logic level input means, a set input means, a reset input means, a signal input means, and an output signal means, one of said first two logic level input means energized at one logic level, and the other of said first two logic level input means energized at a second logic level;

the signal input means of said first $\bar{J}$-$\bar{K}$ flip flops connected to directly receive, of said external reference signal and said external feedback signal, only said external reference signal;

said first $\bar{J}$-$\bar{K}$ flip flop being adapted in one of its stable states to provide, in response to the occurrence of a specified condition of said first external reference signal, a first output signal on the output signal means of said first J-K flip flop;

a second $\bar{J}$-$\bar{K}$ flip flop having two stable states and having a second two logic levels input means, a set input means, a reset input means, a signal input means, and an output signal means, one of said second two logic input means energized at one logic level, and the other of said two logic means energized at a second logic level;

the signal input means of said second $\bar{J}$-$\bar{K}$ flip flop connected to directly receive of said external reference signal and said external feedback signal only said external time varying fed back signal;

said second $\bar{J}$-$\bar{K}$ flip flop being adapted in one of its stable states to provide, in response to the occurrence of the same specified condition of said external time varying fed back signal, a second output signal on the output signal means of said second $\bar{J}$-$\bar{K}$ flip flop;

said one of said first two logic level input means and said one of said second two logic level means connected together;

said other one of said first two logic level input means, the reset input means of said first $\bar{J}$-$\bar{K}$ flip flop, said other one of said second two logic level input means, and the set input means of said second $\bar{J}$-$\bar{K}$ flip flop connected together;

logic means for comparing said first and second output signals and providing a change of state output signal upon the occurrence of the second one of said specified conditions of said external time varying reference and fed back signals;

means for applying said change of state signal to the set input means of said first $\bar{J}$-$\bar{K}$ flip flop and to the reset input means of said second $\bar{J}$-$\bar{K}$ flip flop; and means for generating an output signal in accordance with the phase difference between said specified condition of said external reference and fed back time varying signals.

7. The digital control circuit according to claim 6 wherein said means for generating an output signal comprises further logic means responsive to said first and second output signals for controlling an output circuit in accordance with the phase difference between said specific conditions of said external reference and fed back time varying signals.

8. A digital control circuit according to claim 7 wherein said further logic means comprises one logic device responsive to said first output signal and a second logic device responsive to said second output signal; said output circuit comprises a series circuit for first transistor responsive to an output signal from said one logic device, a second transistor responsive to an output signal from said second logic device, a voltage source thereacross, and a voltage responsive member connected between one terminal of said voltage source and the juncture of said first and second transistors.

9. A digital control circuit for detecting the phase between an external time varying reference signal and an external time varying signal responsive to such phase which is fed back from the output of such circuit comprising a first bistable means adapted to receive of said external references signal and said external feedback signal only said external reference signal, and being adapted in one of its bistable states to provide, in response to the occurrence of a specified condition of said external reference signal, an output signal;

a second bistable means adapted to receive only said external time varying fed back signal, and being adapted in one of its bistable states to provide, in response to the occurrence of the same specified condition of said external time varying fed back signal, a second output signal;

logic means for comparing said first and second output signals and providing a change of state output signal upon the occurrence of the second one of said specified conditions of said external time varying reference and fed back signals;

means for applying said change of state signal to said first and second bistable means;

further logic means responsive to said first and second output signals for controlling an output circuit in accordance with the phase difference between said specific conditions of said external reference and fed back time varying signals;

said further logic means comprises one logic device responsive to said first output signal and a second logic device responsive to said second output signal;

said output circuit comprises a series circuit for first transistor responsive to an output signal from said one logic device, a second transistor responsive to an output signal from said second logic device, a voltage source thereacross, and a voltage responsive member connected between one terminal of said voltage source and the juncture of said first and second transistors; and a voltage controlled oscillator energized by the voltage of said voltage responsive member, the output time varying signal of said oscillator being fed back to said second bistable means.

10. The digital control circuit according to claim 9 wherein the voltage controlled oscillator includes means for varying its frequency.

11. The digital control circuit according to claim 9 wherein the voltage controlled oscillator includes means for varying the phase of its output frequency.

* * * * *

UNITED STATES PATENT OFFICE
CERTIFICATE OF CORRECTION

Patent No. 3,714,463 Dated January 30, 1973

Inventor(s) Jon M. DeLaune

It is certified that error appears in the above-identified patent and that said Letters Patent are hereby corrected as shown below:

Page 1, change name of inventor from Jon M. Laune to Jon M. DeLaune.

Signed and sealed this 29th day of May 1973.

(SEAL)
Attest:

EDWARD M.FLETCHER,JR.
Attesting Officer

ROBERT GOTTSCHALK
Commissioner of Patents